United States Patent [19]

Barrow

[11] Patent Number: 5,800,096

[45] Date of Patent: Sep. 1, 1998

[54] SUBSURFACE BARRIER WALL AND METHOD OF INSTALLATION

[76] Inventor: Jeffrey Barrow, 640 College St., Woodland, Calif. 95695

[21] Appl. No.: 703,850

[22] Filed: Aug. 27, 1996

Related U.S. Application Data

[63] Continuation-in-part of Ser. No. 429,818, Apr. 27, 1995, Pat. No. 5,549,170.

[51] Int. Cl.$^6$ ............................................. E02D 5/08
[52] U.S. Cl. ............................. 405/267; 405/280; 405/249
[58] Field of Search .................................. 405/267, 270, 405/274, 275, 276, 278, 279, 280, 281, 249

[56] References Cited

U.S. PATENT DOCUMENTS

| | | | |
|---|---|---|---|
| 2,101,285 | 12/1937 | Stevens | 405/278 |
| 2,128,428 | 8/1938 | Murray, Jr. | 405/278 |
| 3,375,884 | 4/1968 | Bodine, Jr. | 175/22 |
| 3,379,263 | 4/1968 | Bodine, Jr. | 175/55 |
| 3,384,188 | 5/1968 | Bodine, Jr. | 175/55 |
| 3,394,766 | 7/1968 | LeBelle | 175/55 |
| 3,411,305 | 11/1968 | Cella | 405/280 |
| 4,403,665 | 9/1983 | Bodine | 175/55 |
| 4,471,838 | 9/1984 | Bodine | 166/249 |
| 4,487,554 | 12/1984 | Bodine | 417/241 |
| 4,527,637 | 7/1985 | Bodine | 175/55 |
| 4,548,281 | 10/1985 | Bodine | 175/55 |
| 4,615,400 | 10/1986 | Bodine | 175/55 |
| 4,693,326 | 9/1987 | Bodine | 175/55 |
| 4,702,315 | 10/1987 | Bodine | 166/249 |
| 4,817,712 | 4/1989 | Bodine | 166/249 |
| 4,836,299 | 6/1989 | Bodine | 175/22 |

(List continued on next page.)

FOREIGN PATENT DOCUMENTS

| | | |
|---|---|---|
| 0 186 921 A1 | 7/1986 | European Pat. Off. . |
| WO 91/08176 | 6/1991 | European Pat. Off. . |
| WO 93/04237 | 3/1993 | European Pat. Off. . |
| 2755431 | 6/1979 | Germany ............ 405/280 |
| 41 25 515 A1 | 2/1993 | Germany . |
| 46129 | 7/1973 | Japan ............ 405/280 |
| 110713 | 7/1983 | Japan ............ 405/280 |
| 2 185 901 | 8/1987 | United Kingdom . |
| 2 228 760 | 5/1990 | United Kingdom . |
| 561765 | 6/1994 | United Kingdom ...... 405/279 |

OTHER PUBLICATIONS

"Zeolite Treats Polluted Ground Water", International Ground Water Technology, Apr. 1996; p. 29.

"Firm Pushes Process To Deep–Freeze Wastes", ENR/Nov. 15, 1993; p. 53.

"SEG Studies Putting Wastes On Ice", The Oak Ridger, 46th Year—No. 86.

Wilhelm, "EPA Is Hot On RKK Plan To Freeze Leaking Waste", Puget Sound Business Journal; Jun. 10–16, 1994; p. 7.

"Kundel Shoring System" an advertisement in Engineering News Record, published in 1996.

Suttin, "How Methane Injection Attacks Chlorinated Solvents", International Ground Water Technology, Apr. 1996; pp. 7–9.

"Retaining Walls", Bauer International, pp. 22, 24, 26, 27, 28, 30, 31.

(List continued on next page.)

*Primary Examiner*—Tamara L. Graysay
*Assistant Examiner*—Frederick L. Lagman
*Attorney, Agent, or Firm*—Townsend and Townsend and Crew LLP

[57] ABSTRACT

A subsurface barrier wall having a number of interconnected columns is disclosed. The columns are driven into the subsurface, one next to the other in interlocking fashion, with a percussive drive hammer. A sonic drilling tool is driven ahead of the columns. The columns include interconnecting elements which slidably couple adjacent columns together as a column is being driven into the subsurface. The barrier wall may be used to divert, contain, or remediate the migration of subsurface contaminants.

21 Claims, 13 Drawing Sheets

U.S. PATENT DOCUMENTS

| | | | |
|---|---|---|---|
| 4,842,448 | 6/1989 | Koerner et al. | 405/258 |
| 4,848,486 | 7/1989 | Bodine | 175/55 |
| 4,860,544 | 8/1989 | Krieg et al. | 632/45.1 |
| 4,877,357 | 10/1989 | Verstraeten | 405/267 |
| 4,974,425 | 12/1990 | Krieg et al. | 62/45.1 |
| 4,981,590 | 1/1991 | Prochhorst | 405/278 X |
| 5,030,034 | 7/1991 | Bodine | 405/128 |
| 5,054,961 | 10/1991 | Sherman | 405/128 |
| 5,057,227 | 10/1991 | Cohen | 210/680 |
| 5,106,233 | 4/1992 | Breaux | 405/128 |
| 5,132,021 | 7/1992 | Alexander | 210/679 |
| 5,240,348 | 8/1993 | Breaux | 405/128 |
| 5,348,422 | 9/1994 | Manchak, III et al. | 405/128 |
| 5,354,149 | 10/1994 | Breaux | 405/128 |
| 5,360,293 | 11/1994 | Breaux et al. | 405/267 |
| 5,417,290 | 5/1995 | Barrow | 175/22 |
| 5,487,622 | 1/1996 | Cherry et al. | 405/128 |
| 5,549,170 | 8/1996 | Barrow | 175/55 |

OTHER PUBLICATIONS

Brubaker, "Designing Microbial Remediation Barriers", International Ground Water Technology, Mar. 1996; pp. 18–22.

McKinsey, "Treat Contaminants With Permeable Walls", International Ground Water Technology, Feb. 1996; pp. 24–25.

Box Piles, a product literature brochure by British Steel Co., Publication No. P120; Oct. 1994.

"Containment And Stabilization of Buried Waste", Landfill Stabilization Focus Area, DOE/EM–0251, Office of Environmental Management, Technology Development, Technology Summary; Jun. 1995.

"Dry Barrier Applications For Landfills", Landfill Stabilization Focus Area, DOE/EM–0251 Office of Environmental Management, Technology Development, Technology Summary; Jun. 1995.

"Develop And Demonstrate Methods Of Placing A Horizontal In Situ Barrier", Landfill Stabilization Focus Area, DOE/EM–0251, Office of Environmental Management, Technology Development, Technology Summary; Jun. 1995.

"Barriers In The Vadose Zone", Landfill Stabilization Focus Area, DOE/EM–0251, Office of Environmental Management, Technology Development, Technology Summary; Jun. 1995.

"Subsurface Barrier Emplacement Development", Landfill Stabilization Focus Area, DOE–EM–0251, Office of Environmental Management, Technology Development, Technology Summary; Jun. 1995.

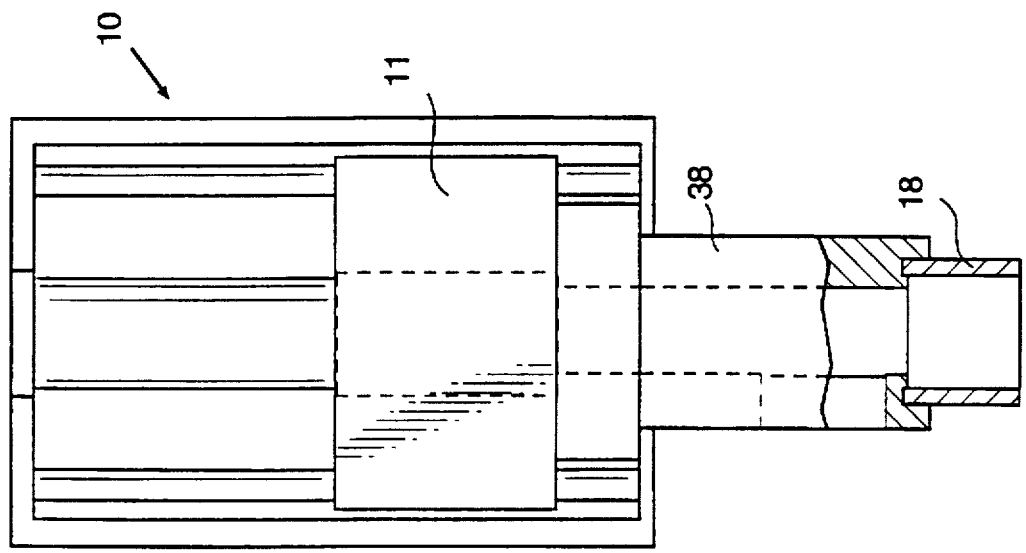
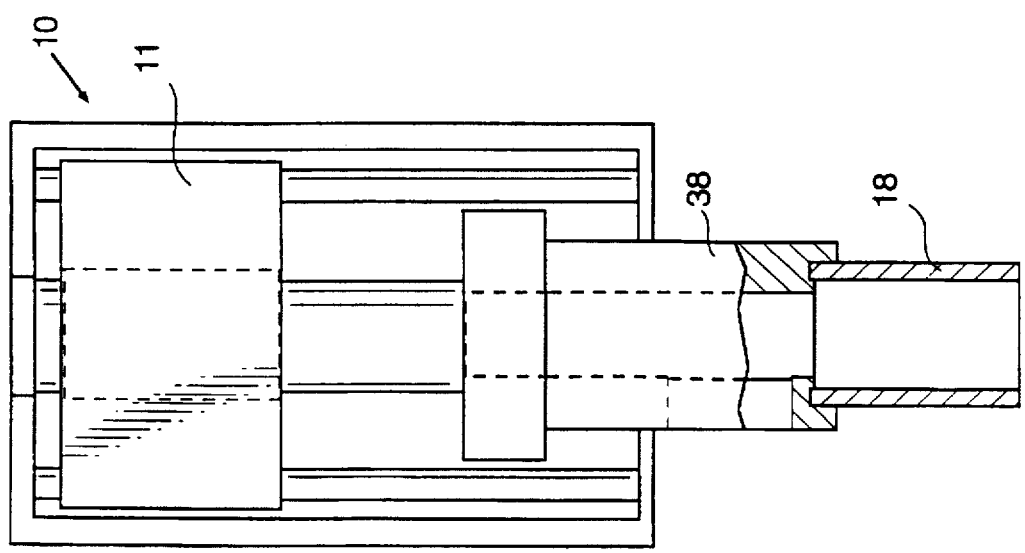

SUBSURFACE BARRIER WALL AND METHOD OF INSTALLATION

CROSS-REFERENCE TO RELATED APPLICATION

This application is a continuation-in-part of application Ser. No. 08/429,818, filed Apr. 27, 1995, now U.S. Pat. No. 5,549,170.

BACKGROUND OF THE INVENTION

1. Field of the Invention

This invention relates generally to subsurface barrier walls, and relates more particularly to a particular subsurface barrier wall and method of installation, wherein the barrier wall comprises interlocking columns driven into the subsurface.

2. Description of the Relevant Art

A casing is often used when removing material from a subsurface. The casing seals the borehole, prevents cross-contamination of aquifers and the borehole environment, and prevents the borehole from caving in as drilling progresses. The casing also provides a conduit for well casing, sand, bentonite and cement.

A known technique for casing a borehole is commonly referred to as air rotary casing hammer. A hollow rotary drill pipe having a drill bit at the downhole end is used to cut through the formation. The casing, which surrounds the drill pipe, is driven into the formation using a hammer which pounds the casing into the formation with a number of successive blows. The bottom of the casing has a drive shoe to facilitate penetration of the formation.

Rotary drilling produces cuttings which must be removed for continued drilling. Air or mud is introduced through the interior of the drill pipe as a circulating medium to remove the cuttings. The air or mud flows down the hollow interior of the drill pipe to the bottom of the borehole and circulates back up the borehole in the annular area between the drill pipe and casing. The air or mud and cuttings are then discharged into a hopper for subsequent analysis, treatment and/or disposal.

A problem with air rotary casing hammer is the production of waste products due to the use of a circulating medium and the fact that rotary drilling produces cuttings which must be removed for continued drilling. When operating below the water table, air rotary drilling also brings a substantial amount of water out of the formation which must be disposed of. The fluid and cuttings must be stored, tested, treated, and disposed of in accordance with strict Federal and State regulations when working in a potentially contaminated formation. Transportation, testing, treatment and disposal of the fluid and cuttings significantly increases the cost involved with the drilling, sampling and/or well construction.

Another problem with air rotary casing hammer is that the circulating air can carry contaminated dust and water vapor outside the borehole and into the environment.

The present invention is directed to methods and apparatus for forming a subsurface barrier wall. Barrier walls are used to contain, remove and/or treat contaminants in the subsurface. Barrier walls are disclosed in U.S. Pat. Nos. 5,487,622 and 5,354,149 which are incorporated herein by reference.

U.S. Pat. No. 5,487,622 describes an in-situ method of treating contaminants with an impermeable barrier wall having a fluid gate leading to a remediation chamber. The barrier wall is sized and configured to prevent contaminated fluid from flowing around or under the barrier wall. The barrier wall is impermeable so that contaminants cannot leak through the wall. The gate permits contaminants to flow into a remediation chamber. The remediation chamber contains an appropriate material to treat the contaminated groundwater. The remediation chamber has a width selected so that groundwater is treated upon flowing through the remediation chamber and then simply flows back into the subsurface through holes in the downstream side of the remediation chamber.

U.S. Pat. No. 5,354,149 describes another method of using a barrier wall in which the barrier wall is constructed to surround a contaminated area. The contaminated material surrounded by the wall is drawn through a pass-through in the wall for subsequent treatment.

Conventional barrier walls are installed by digging a trench to the desired depth, usually to a fluid impermeable layer below the contaminated area, and lowering the barrier wall into the trench as illustrated in U.S. Pat. No. 5,354,149. A problem with the conventional method of digging a trench is that the depth of the barrier wall is somewhat limited in unconsolidated formations since the trench walls collapse at large depths. Another problem with the conventional method of installing a barrier wall is the time required to dig the trench, remove the soil, and backfill around the barrier wall after the barrier wall has been installed.

SUMMARY OF THE INVENTION

In accordance with the illustrated preferred embodiment, the present invention provides an apparatus and related method for constructing a subsurface barrier wall. The method includes the steps of driving a hollow column into a subsurface and subsequently driving another hollow column into the subsurface adjacent the first column. The columns have interlocking connections so that the columns are slidably coupled together when driven into the subsurface. The columns are preferably driven into the subsurface with a percussive hammer.

The columns are driven, one next to the other in interlocking fashion, to form a subsurface barrier wall. The position, depth, orientation, angulation and shape of the wall can be selected to control the migration of contaminated groundwater. In order to ensure that groundwater does not flow through the wall, the interlocking connections form a substantially fluid impermeable seal. The interlocking connection may be sealed in any manner and is preferably sealed by injecting grout into the interlocking connection through pipes attached to the columns. The fluid impermeable seal ensures that groundwater in the formation does not simply pass through the wall at the interlocking connections.

In a preferred method of the present invention, another drilling tool passes through the column and is used to remove subsurface material. The drilling tool is preferably a sonic drilling tool which is advanced ahead of the column. Advancing the sonic drilling tool before the column reduces the resistance to driving the column which also reduces the likelihood that the column becomes skewed with respect to previously driven columns.

Another aspect of the present invention solves the problems associated with air and mud rotary casing hammer by providing a sonic drilling assembly which minimizes the amount of cuttings produced. Sonic drilling methods and apparatus are disclosed in U.S. Pat. Nos. 4,836,299, 4,548, 281 and U.S. patent application Ser. No. 08/300,251 (allowed and issue fee paid), which are herein incorporated by reference.

Sonic drilling is accomplished by vibrating a drill string to produce compressive and expansive waves in the drill string. The vibrations are induced in a longitudinal direction of the drill string and the drill string is preferably vibrated at a resonant frequency. The resonant frequency is dependent upon a number of factors including the length of the drill string.

The vibrational forces on the drill string causes the drill string to contract and expand in the longitudinal direction. The vibrational forces at the bottom of the drill string shear, displace and/or otherwise fracture apart the soil particles thereby cutting through the formation.

The drill string preferably includes a number of drill rods which are connected together end-to-end. A sample barrel may be attached to one of the drill rods at a downhole end of the drill string. The sample barrel has an open end leading to a hollow interior which receives a continuous core of the formation. Although the term "sample barrel" is used herein, the sample barrel may also be used for drilling rather than sampling.

Sonic drilling provides clear advantages over the gross sampling method of rotary drilling since near in-situ quality core samples are produced. When it is desired to collect a soil sample, the drill string is recovered from the subsurface and the material is saved for subsequent testing.

It has been found that sonic drilling advantageously minimizes the amount of waste produced during drilling and, in some applications, no waste is produced other than the core sample itself. Formation material not taken as sample into the hollow interior of the sample barrel is displaced back into the formation. The fluidization of the cuttings around the drill string permits the cuttings to be reabsorbed by the formation. The minimization of cuttings and waste advantageously reduces the cost of storing, transporting, testing, treating and disposing of the cuttings.

Furthermore, sonic drilling does not require a circulating medium since the cuttings are reabsorbed into the formation. Air and mud rotary drilling, on the other hand, requires a circulating medium to remove the cuttings from the borehole for continued drilling. When working in a potentially contaminated site, the present invention does not require a circulating medium and, therefore, there is no need to save, analyze, treat and dispose of the circulating medium and cuttings.

Sonic drilling is particularly useful, and finds distinct advantages over air and mud rotary drilling, when drilling or sampling below the water table. When drilling below the water table, air rotary drilling can generate significant quantities of groundwater waste which must be saved, analyzed, treated and disposed of. Sonic drilling, on the other hand, does not require a circulating medium and, thus, groundwater is not brought out of the borehole during drilling. Another problem encountered when using mud rotary drilling is that the mud and fluid can easily become contaminated and cross-contaminate other aquifers. The mud also can impregnate the aquifer and reduce the yield or plug it off from further production.

In a preferred embodiment, the sonic drill string and casing are driven into the formation simultaneously. Although it is preferred to drive the casing and sonically advance the drill string simultaneously, the casing may also be driven before or after the drill string. The drill string is also preferably rotated during sonic vibration to improve the cutting action.

The casing preferably has an inner diameter compatible with the outer diameter of the sample barrel so that spoils and cuttings are minimized or even eliminated altogether. Specifically, the inner diameter of the casing has a diameter which is preferably equal to or less than 4 inches larger than the outer diameter of the sample barrel, more preferably equal to or less than 2 inches larger, and most preferably equal to or less than 1 inch larger than the outer diameter of the sample barrel. When using mud or air rotary casing hammer, the casing must be sized sufficiently larger than the rotary bit and drill pipe so that an annular area is provided between the bit and casing for the circulating medium.

Although an advantage of sonic drilling is the ability to drill without requiring a circulating fluid, a fluid may be introduced for the purpose of enhancing reabsorption of the cuttings into the formation.

In another aspect of the invention, two sonic head assemblies are provided, one for driving the drill string and one for driving the casing. A cable tool assembly is also preferably provided with the drill rig. The cable tool assembly includes a cable and a cable manipulator for manipulating the cable. When using the cable tool assembly, the cable extends through the throughhole in the casing sonic head. The cable tool assembly works in a manner known to those having skill in the art.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 8 shows the casing hammer having a hammer in a retracted position; and

FIG. 9 shows the hammer of FIG. 8 in a driving position.

DETAILED DESCRIPTION OF THE PREFERRED EMBODIMENT

FIGS. 1 through 16 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
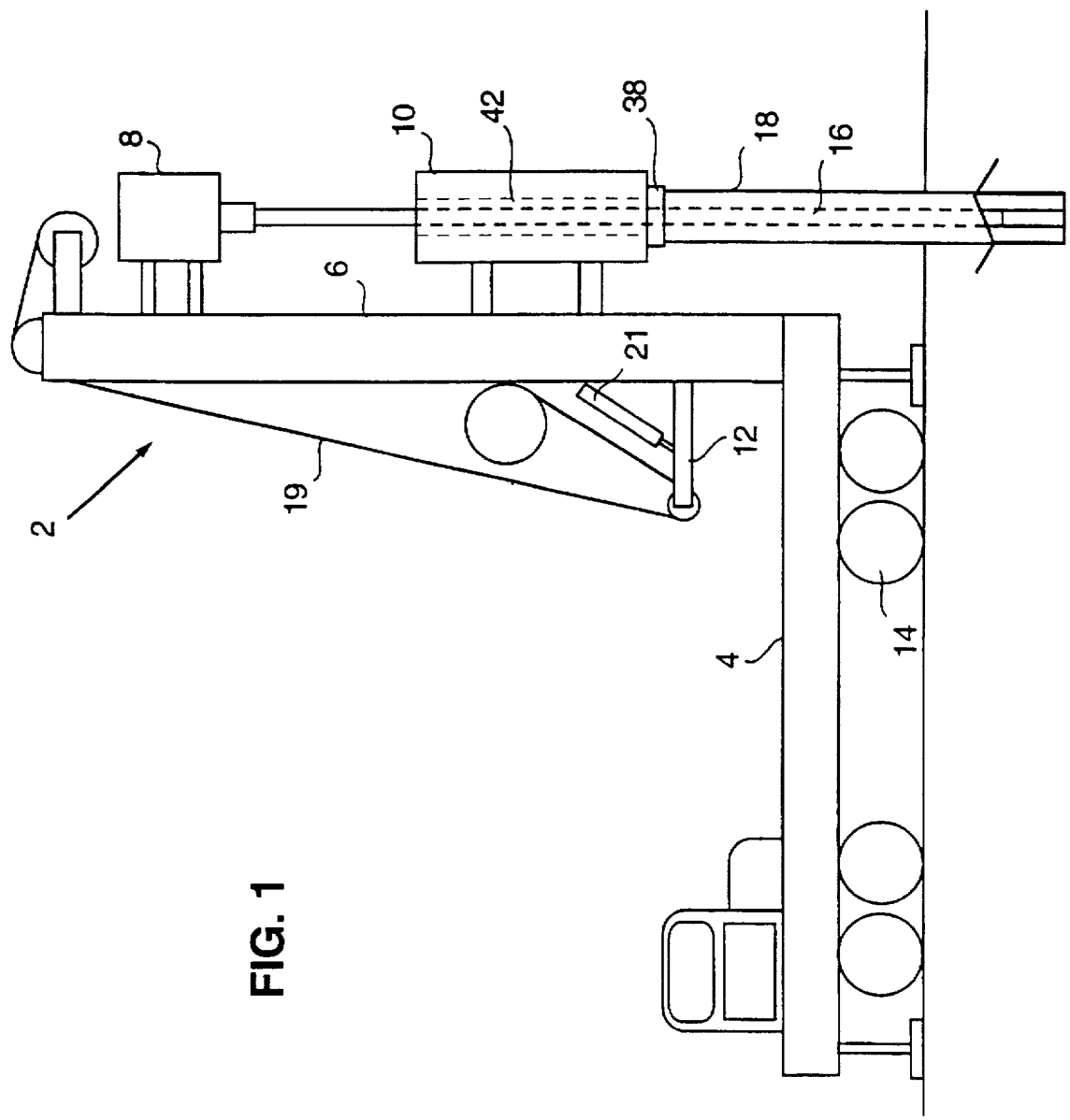
FIG. 1 shows a first, preferred drill rig having a casing hammer, a sonic head, and a cable tool assembly.

A drill rig 2 is shown in FIG. 1. The drill rig 2 includes a carrier 4 having a mast 6 to which is mounted a sonic head 8, a casing hammer 10, and a cable tool assembly 12. The drill rig 2 also has wheels 14 so that it may be moved to various sites.

The sonic head 8 is configured to advance a drill string 16 into a subsurface by inducing vibrations in the drill string 16. The casing hammer 10 is configured to drive a casing 18 into the subsurface with a number of successive blows. The cable tool 12 assembly operates in a manner known to those having skill in the art and may be used for removing spoils from the borehole as described in greater detail below. The cable tool assembly 12 includes a cable 19 and a cable manipulator 21 for manipulating the cable 19.

Figure 2:
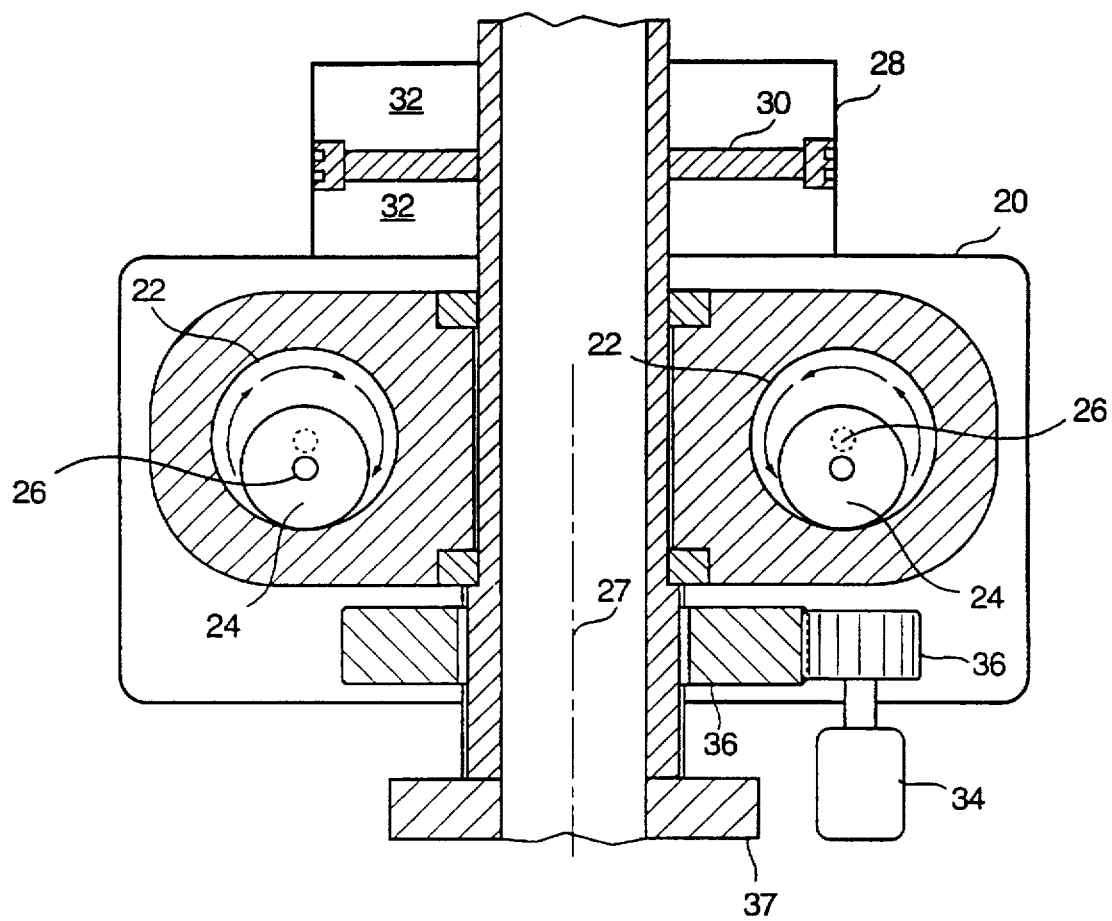
FIG. 2 shows a cross-sectional view of the sonic head of FIG. 1.

Referring to FIG. 2, the sonic head 8 includes an oscillator housing 20 which is coupled to the mast 6. The oscillator housing 20 includes two bores 22 which serve as bearing races. The bores 22 provide orbital pathways for two steel rollers 24 of equal weight. The rollers 24 preferably occupy about ⅔ of the volume of the bores 22.

The rollers 24 are mounted on shafts 26 which are off-center with respect to the bores 22. During operation, the rollers 24 rotate in opposite directions at the same rotational rate and are synchronized so that the rollers 24 are at the bottom and top of the bores 22 at the same time. By timing the rollers 24 in this manner, radial forces are eliminated and only longitudinal forces are imparted on the drill string 16. As will be described in greater detail below, the resulting longitudinal forces produce compressive and expansive pressure waves in the drill string 16 along a longitudinal axis 27 of the drill string 16 for cutting through the formation. The drill string 16 essentially acts as a conduit for storing and transferring the energy from the sonic drill head 8. Although it is preferred to use the sonic head 8 described above, any type of mechanical or electro-mechanical vibrator may be used.

An air spring 28 is attached to the oscillator housing 20 for cushioning the oscillator housing 20 as it cycles through the longitudinal displacements. A piston 30 is attached to the oscillator housing 20 and air chambers 32 are provided above and below the piston 30. The air spring 28 isolates movement and vibration of the oscillator housing 20 from the rest of the drill rig 2 thereby preventing destructive metal to metal contact. The air spring 28 also supports the weight of the suspended drill string 16.

A rotating drive motor 34 and associated gears 36 are provided for rotating the drill string 16. The drill string is connected to the sonic head 8 at an adapter flange 37. The rotating drive motor 34 is used for connecting and disconnecting sections to and from the drill string 16 and for rotating the drill string 16 to assist in drilling. Although it is preferred to rotate the drill string 16 during sonic drilling, the drill string 16 may also be kept rotationally still during drilling.

The drill string 16 is preferably vibrated at a resonant frequency. At the resonant frequency, the vibrations induced in the drill string 16 coincide with the reflected stress waves travelling through the drill string 16. At the resonant frequency, the maximum displacements theoretically and preferably occur at the top and bottom of the drill string 16. The displacements at the bottom of the drill string 16 are attenuated due to the absorption of energy used to drill through the formation. A node of minimum displacement theoretically and preferably occurs at the middle of the drill string 16 since the superimposed pressure waves cancel one another at the midpoint.

Although it is preferred to resonate the drill string 16 at the primary resonant frequency, the drill string 16 may also be resonated at higher order resonant frequencies. The fundamental, or primary, resonant frequency of a length of drill string 16 may be determined by the following formula:

$$\frac{\text{Speed of Sound Through Drill String}}{2 \times \text{Length of Drill String}} = \frac{\text{Fundamental}}{\text{Frequency}}$$

The formula provides a theoretical fundamental resonant frequency with the drill string 16 longitudinally unrestrained at the top and bottom. The bottom is, of course, restrained by contact with the formation and, thus, the value is only a theoretical calculation. The theoretical calculation will, however, aid the operator of the drill rig 2 to find the actual resonant frequency when the interaction between the drill string 16 and formation is taken into account. Typical frequencies for sonic drilling are between 50 to 200 cycles per second (cps) and more preferably between 80 to 150 cps.

The drill string 16 penetrates the formation by shearing, displacing and/or fracturing the soil under the bottom of the drill string 16. The fluidization of the soil, which typically occurs within a quarter inch of the drill string 16, also reduces frictional forces that constrain the drill string 16 so that the drill string 16 penetrates the subsurface easily. A distinct advantage of sonic drilling is the speed and ease with which the drill string 16 can pass through hard formations.

Referring to FIGS. 8 and 9, the casing hammer 10 has a retractable hammer 11 which is preferably pneumatically-driven, although any other driving mechanisms may be used, such as a diesel, steam, or hydraulic pile driver. The top of the casing 18 is slidably attached to an anvil 38 which is pounded by the hammer to drive the casing 18 into the ground. FIG. 8 shows the hammer in a retracted position and FIG. 9 shows the hammer in a driving position in which the hammer impacts and drives the anvil 38.

Figure 6:
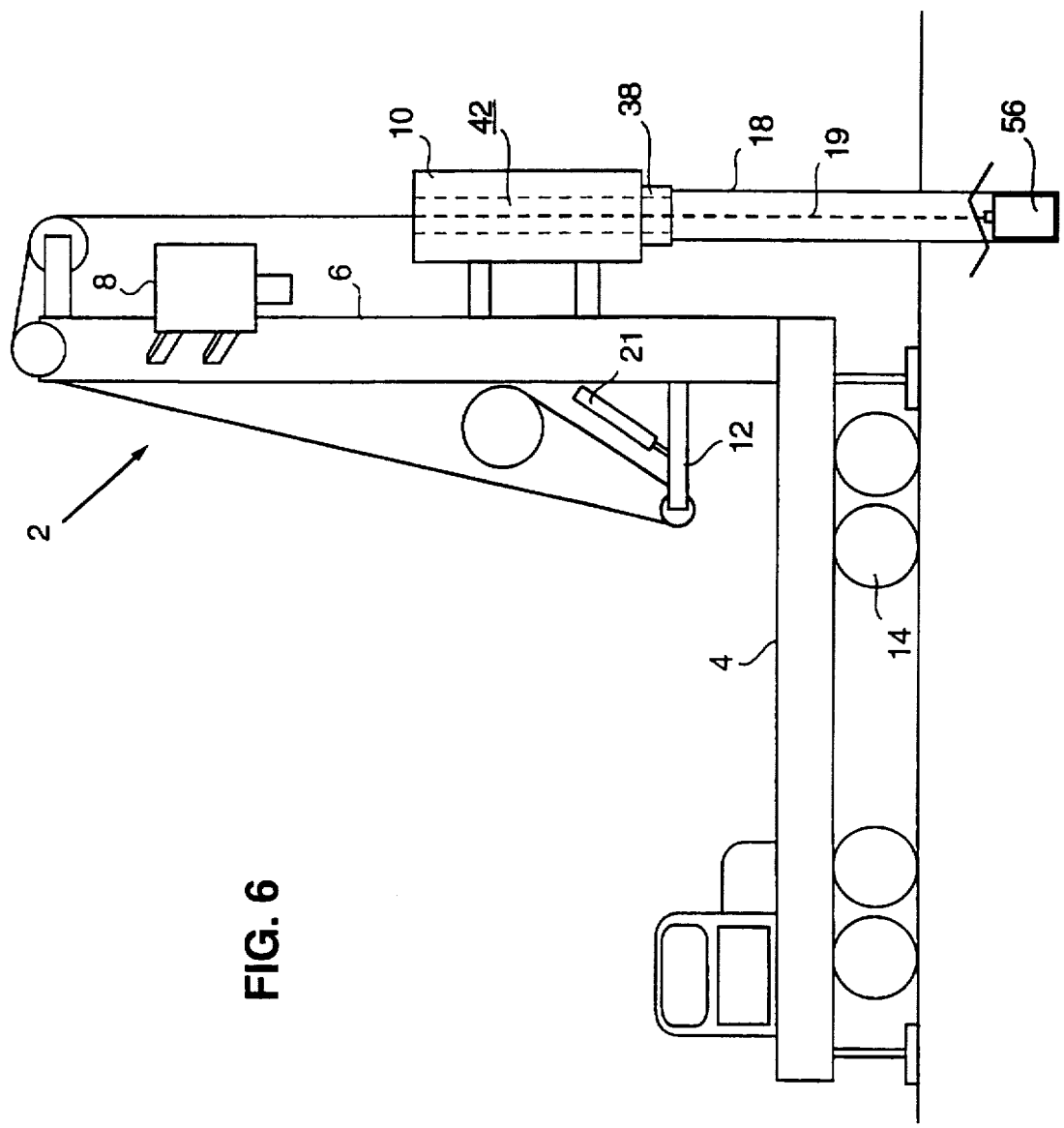
FIG. 6 shows the drill rig of FIG. 1 configured to remove spoils using the cable tool assembly in accordance with the third preferred method.

Referring again to FIG. 1, the bottom of the casing 18 includes a conventional drive element (not shown) to aid in penetrating the formation and to protect the bottom end of the casing 18. The drive element may be open to the interior of the casing, such as a drive shoe, or it may be a closed element that does not allow material to enter the interior. The casing hammer 10 has a throughhole 42 through which the drill string 16 extends. The sonic head 8 is preferably movably mounted to the carrier 4 between a working position (FIG. 1), in which the drill string extends through the throughhole 42, and a standby position (FIG. 6), in which the drill string 16 is positioned outside the throughhole 42. When the sonic head is in the standby position, the sonic head is positioned away from the centerline of the hole being drilled. The sonic head 8 may be movably mounted to the carrier 4 in any manner and is preferably rotatably coupled to the carrier 4 as shown in FIGS. 1 and 6.

Figure 3:
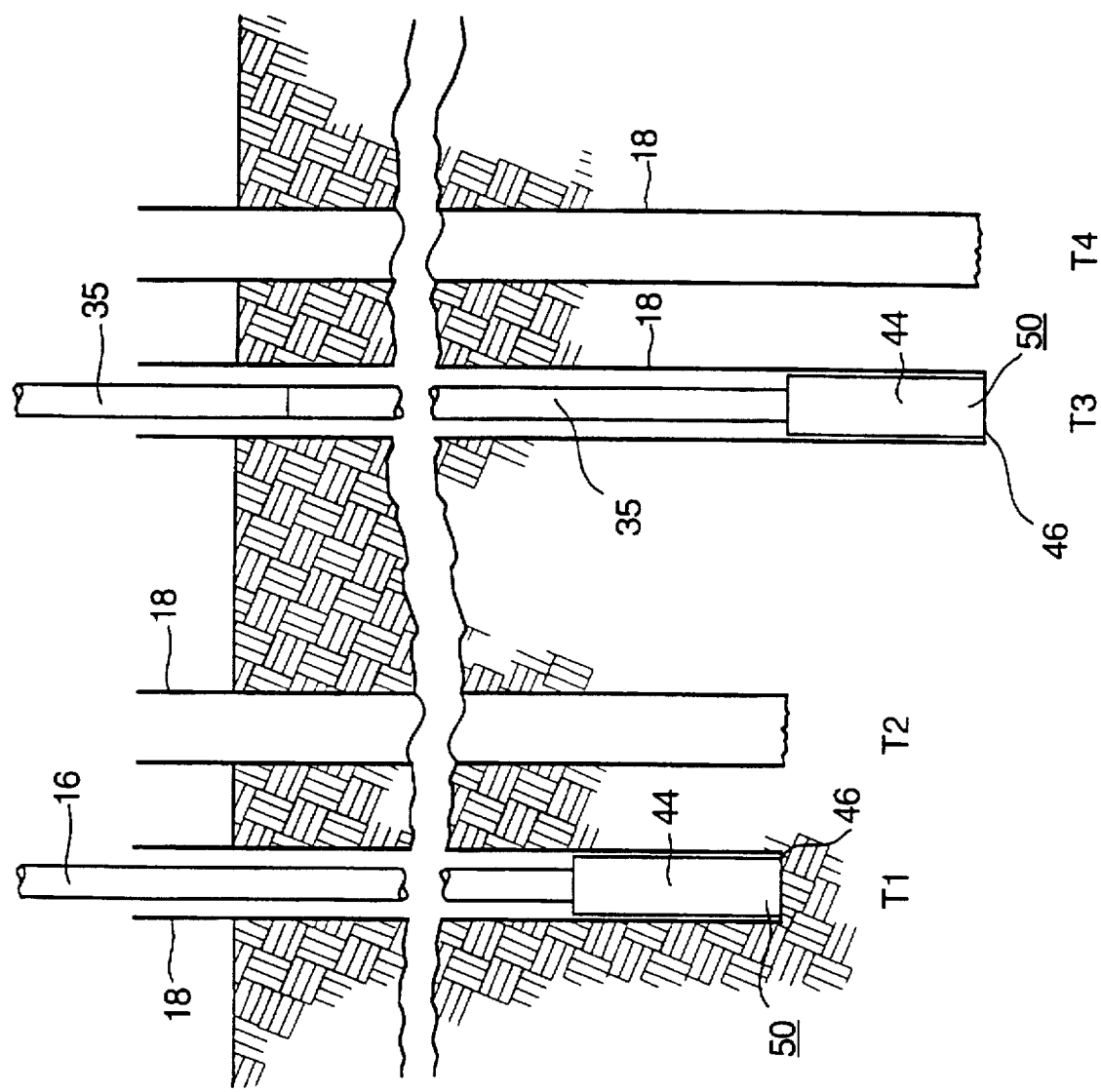
FIG. 3 shows a first preferred method of removing material from a formation in which a sample barrel and casing have compatible sizes so that spoils are minimized.

Referring to FIG. 3, the drill string 16 preferably includes a number of drill rods 35. A preferred drill rod is a 4 ½" OD steel tube having a 10 foot length. The drill rods 35 are threaded at both ends so that a number of drill rods 35 can be connected together to drill to the desired depth. The drill rods are connected together using the motor 34 and associated gears 36 of the sonic drill head 8.

The drill string 16 has a sample barrel 44 connected to one of the drill rods 35 at the downhole end. The sample barrel 44 has a hollow interior 50 into which material from the subsurface enters as the drill string 16 advances through the subsurface. When taking soil samples of the formation, the material is saved for subsequent testing. The sample barrel 44 is preferably formed with two sections along longitudinal split lines (not shown). The two halves of the sample barrel 44 are connected together at the downhole end with a drive shoe 46 and at the uphole end with a cap having a threaded pin which connects to one of the drill rods 35. The drive shoe has an angular cutting edge which facilitates penetration of the formation.

A first, preferred method of removing material from a formation is now described in connection with FIG. 3. As shown in the left-hand part of FIG. 3 marked T1, the drill string 16 and casing 18 are preferably advanced in the formation at the same time. Thus, both the casing hammer 10 and the sonic head 8 are activated to advance the casing 18 and sample barrel 44 simultaneously. The sample barrel 44 is then removed from the formation as indicated at the part of FIG. 3 marked T2. The simultaneous driving of the casing 18 and sample barrel 44 is then repeated as shown at time interval T3 and the sample barrel 44 is retrieved again as shown at interval T4.

Although it is preferred to drive the casing 18 and drill string 16 simultaneously, the drill string 16 and casing 18 may be driven in any order. For example, the sample barrel 44 may be driven ahead of the casing 18 or the casing 18 may be driven before the drill string 16.

The casing 18 preferably has an inner diameter compatible with the outer diameter of the sample barrel 44 so that spoils and cutting are minimized or even eliminated altogether. Specifically, the inner diameter of the casing 18 has a diameter which is preferably equal to or less than 4 inches larger than the outer diameter of the sample barrel, more preferably equal to or less than 2 inches larger, and most preferably equal to or less than 1 inch larger than the outer diameter of the sample barrel 44. As discussed above, sizing the sample barrel 44 and casing 18 in this manner reduces or even eliminates waste products altogether. Since no spoils are produced other than the core itself, no circulating medium is required to remove cuttings.

A second, preferred method of removing material from a formation will now be described in connection with FIG. 4. Although it is preferred to provide the relative dimensions between the casing 18 and drill string 16 as described above, the sample barrel 44 may also be sized smaller relative to the casing 18 than the preferred dimensions. The sample barrel 44 in the second preferred method is preferably smaller than the sample barrel 44 of FIG. 3 so that spoils 52 from the subsurface remain in the casing 18 after removal of the sample barrel 44.

Figure 4:
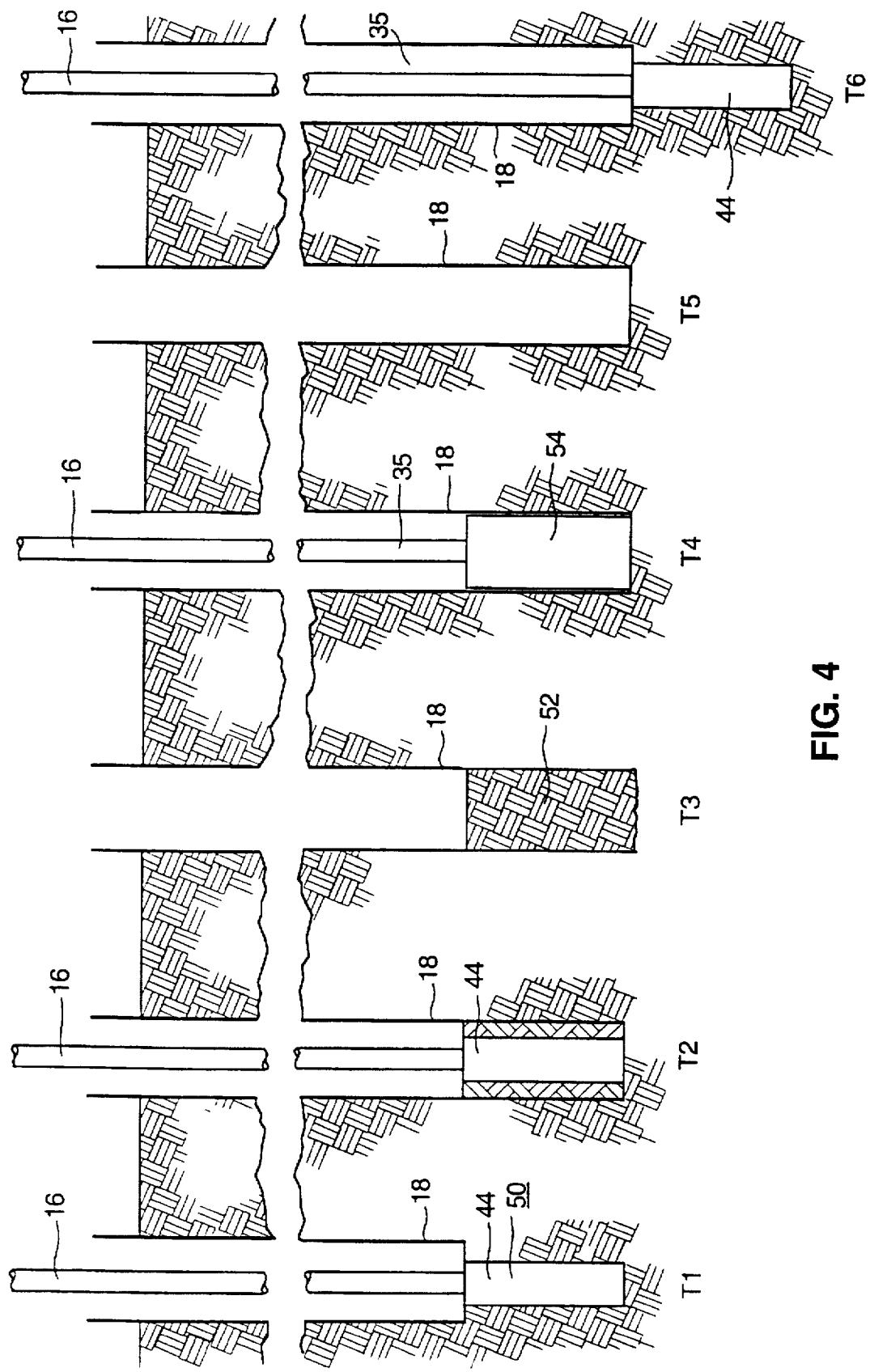
FIG. 4 shows a second preferred method of removing material from a formation in which the spoils are removed with a spoils barrel.

As shown at time interval T1 of FIG. 4, the sample barrel 44 is first sonically driven into the formation to force the soil sample into the hollow interior 50 of the sample barrel 44. The casing 18 is then advanced around the sample barrel 44 as shown at time interval T2. At time interval T3 the sample barrel 44 is removed leaving the spoils 52 behind. A spoils barrel 54 is then attached to the drill string 16 and the spoils 52 are removed as shown at time intervals T4 and T5. The process is then repeated and the sample barrel 44 is lowered into the borehole to retrieve more material as shown at time interval T6. As discussed above in connection with the first preferred method, the order of advancement of the casing 18 and drill string 16 may be in any other order. For example, the casing 18 may be driven before or at the same time as the drive string 16. Although the second preferred method produces spoils 52, the second preferred method still does not require a circulating fluid and, thus, provides an advantage over conventional mud and air rotary casing hammer.

A third preferred method of removing material from a formation will now be described in connection with FIGS. 5 and 6. The third preferred method is substantially the same as the second preferred method except that the spoils 52 are removed using a cable tool clean-out barrel 56 which is operated with the cable tool assembly 12. The cable tool clean-out barrel 56 is a conventional tool and is known to those having skill in the art.

Figure 5:
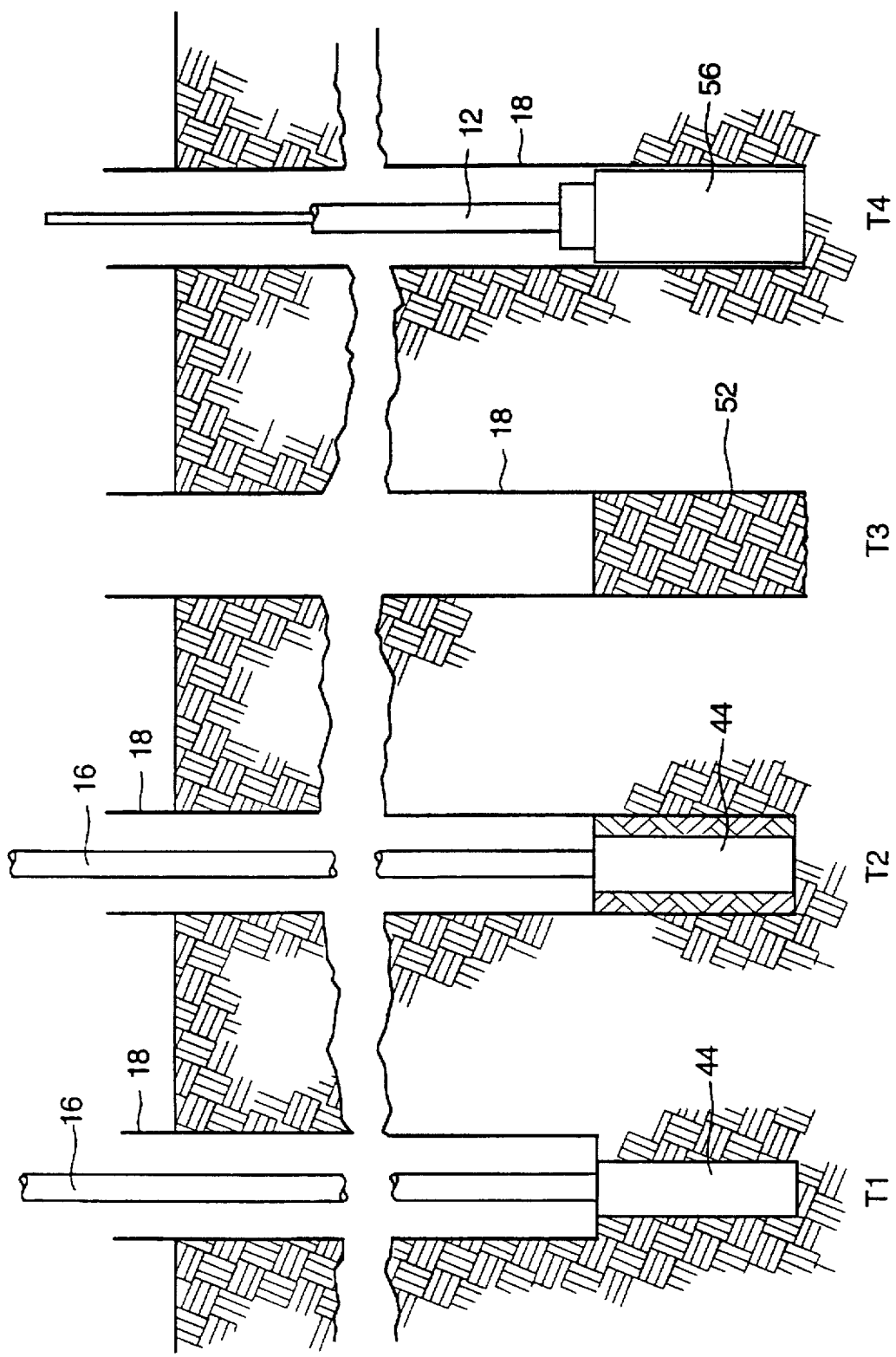
FIG. 5 shows a third preferred method of removing material from a formation in which the spoils are removed using the cable tool assembly.

As shown at time interval T1 of FIG. 5, the sample barrel 44 is first sonically driven into the formation. The casing 18 is then driven around the sample barrel 44 as shown at time interval T2 and the sample barrel 44 is removed as shown at time interval T3. The spoils 52 are then removed with the cable tool clean-out barrel 56 as shown at time interval T4. The cable tool assembly 12 provides an efficient method of removing the spoils since it can be lowered to the bottom of the borehole quickly thereby saving time when drilling or sampling at large depths.

The drill rig 2 is configured as shown in FIG. 6 for removing the spoils 52 during time interval T4 of FIG. 5. The sonic head 8 and casing hammer 10 are moved to the standby position and the cable 19 of the cable tool assembly 12 is moved over the centerline of the casing 18. The casing hammer 10 is also preferably movably mounted to the carrier 4 so that the throughhole 42 is no longer aligned with the centerline of the casing 18. When the casing hammer is moved to a standby position, the cable 19 does not extend through the throughhole 42 of the casing hammer 10 in a manner similar to the sonic head 8 which is swung out of the way.

Figure 7:
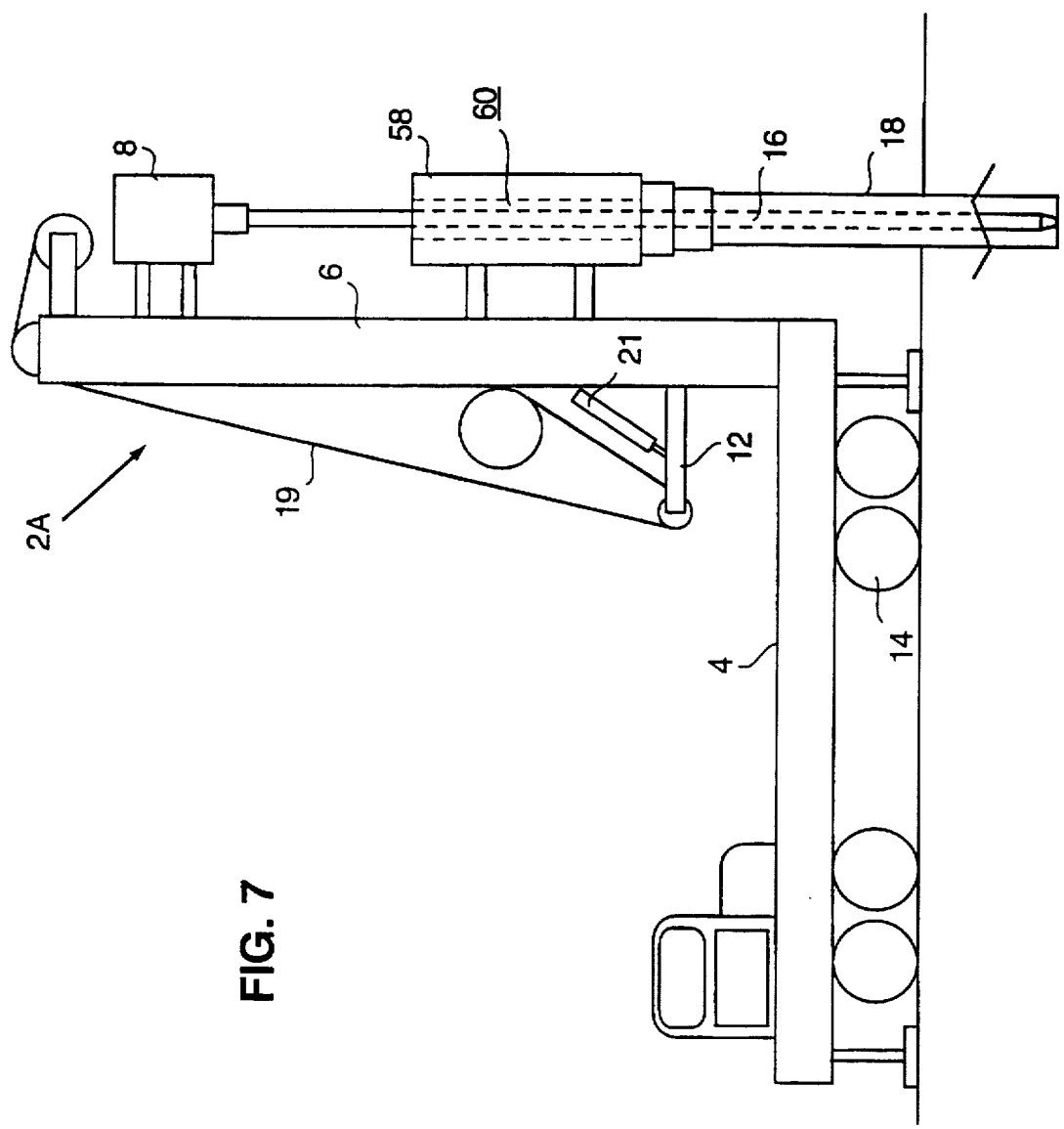
FIG. 7 shows a second, preferred drill rig having a second sonic head for driving the casing.

A second preferred drill rig 2A is shown in FIG. 7. The second preferred drill rig 2A includes a second sonic head 58 for driving the casing 18. The second sonic head 58 is preferably larger or at least the same size as the sonic head 8 described above in connection with FIG. 2. The casing sonic head 58, like the casing hammer 10 of the drill rig 2, includes a throughhole 60 through which the drill string 16 extends. The sonic head 8 is movably mounted to the carrier 4 as described above in connection with the drill rig 2.

The second preferred drill rig 2A may be operated in accordance with any of the three preferred methods with the only difference being that the casing 18 is driven into the formation with the second sonic head 58 rather than the casing hammer 10 of FIG. 1. An advantage of providing the casing sonic head 58 is that the cuttings and spoils are further minimized since the cuttings produced from driving the casing 18 are reabsorbed by the formation as described above.

According to the present invention, methods and devices for forming a subsurface barrier wall are described. As discussed above, conventional barrier walls are installed by digging a trench and lowering the barrier wall into the trench. A problem with the conventional method of digging a trench is that the depth of the barrier wall is limited in unconsolidated formations since the trench walls will collapse at large depths.

Figure 11:
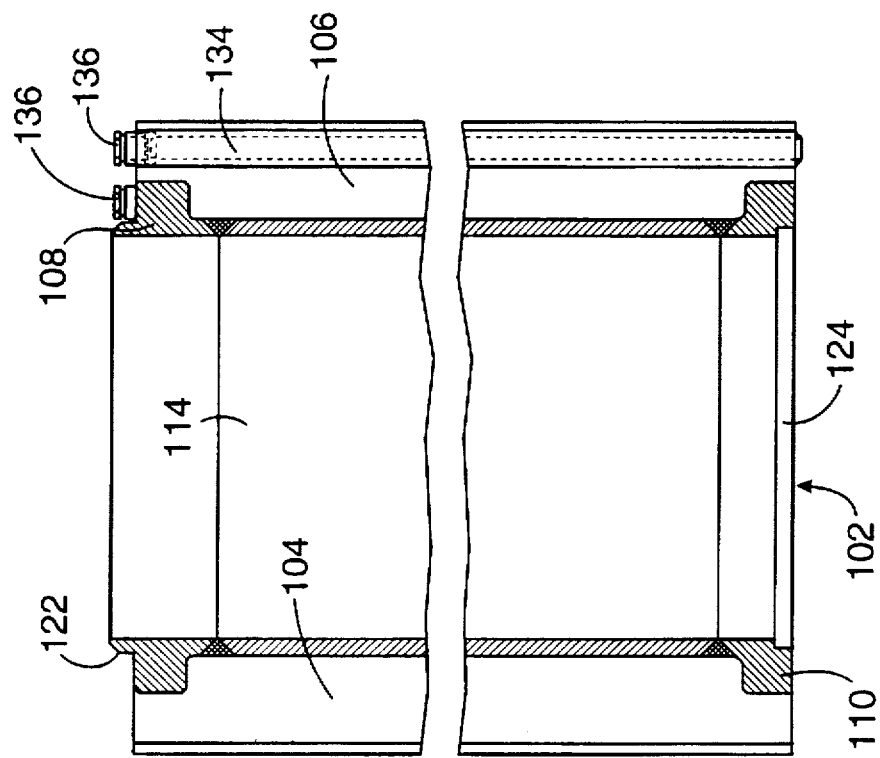
FIG. 11 is a cross-sectional view of the column section of FIG. 10.
Figure 10:
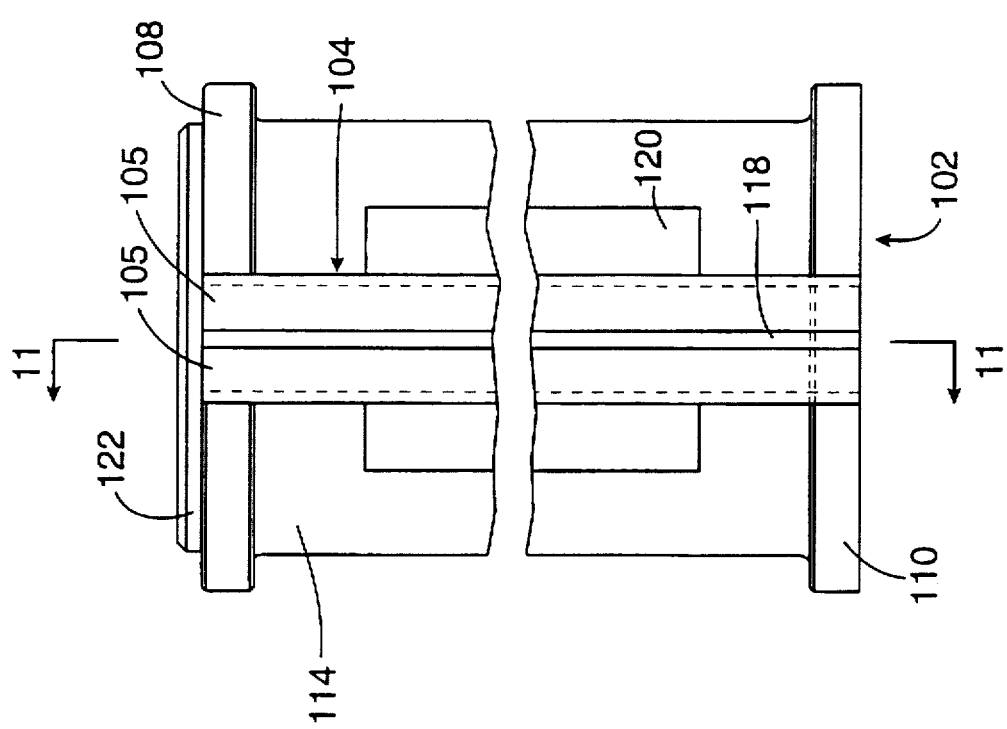
FIG. 10 is a side view of a column section.

The present invention provides devices and methods for forming a barrier wall which is driven into the subsurface so that digging a trench is unnecessary. Referring to FIGS. 10 and 11, side and cross-sectional views of a column section 102 of the present invention are shown. The column section 102 is a building block for the barrier wall of the present invention. Columns are formed by coupling together two or more column sections 102. Column sections 102 are added one at a time to the top of the column as the column is driven into the subsurface to the desired depth. The barrier wall is created by installing two or more interconnected columns side-by-side and then sealing the space between the columns.

Each column section 102 has a longitudinally-extending body 114 which is preferably a section of pipe. The column sections 102 are preferably at least five feet long and more preferably at least ten feet long. A preferred pipe size is eight inch with a wall thickness of one-half inch, however, any other size or thickness may be used. Although the body 114 of the column section is preferred a circular cross-sectional shape, any other shape, such as square or rectangle, may also be used.

Each column section 102 has an upper flange 108 and a lower flange 110 that permit the column sections to be bolted together to form a column. The column sections may be welded together or joined in any other manner. The upper and lower flanges 108, 110 include bolt holes 126 (FIG. 13) which receive bolts for bolting together the upper flange 108 of one column section to the lower flange 110 of a overlying column section. The upper flange 108 has a lip 122 which engages a recess 124 in the lower flange 110 of an overlying column section. A groove (not shown) for an O-ring may also be provided for improving the fluid seal between the column sections.

Figure 13:
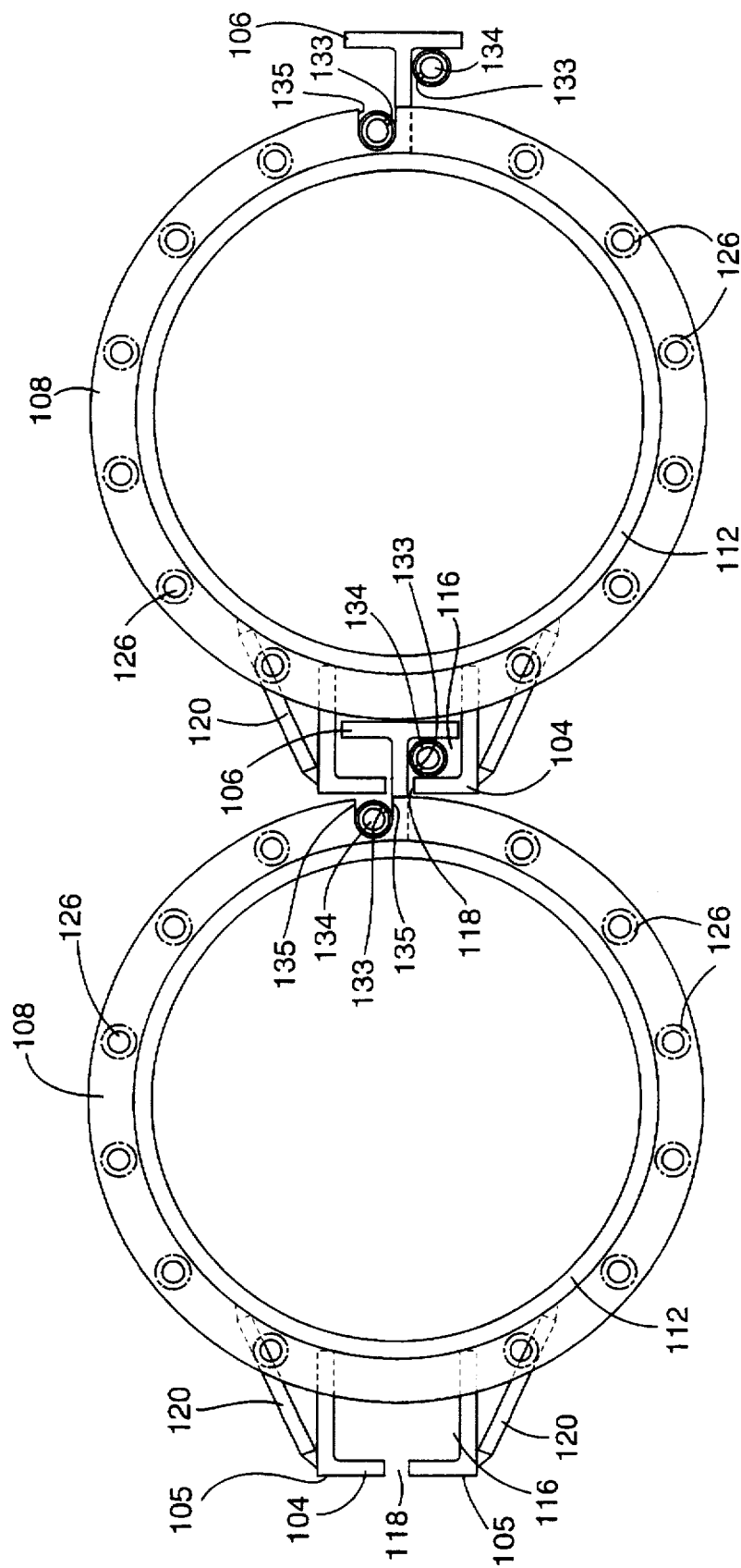
FIG. 13 is a plan view of two interlocked columns forming a portion of a barrier wall.

Each column section 102 has a first interlocking element 104 and a second interlocking element located on opposite sides of the column section. The first and second interlocking elements 104 and 106 extend longitudinally along the length of the column section 102. The first interlocking element 104 is designed to engage and interlock with a second interlocking element 106 of an adjacent column, as shown in FIG. 13. The first interlocking element 104 is an open channel with a slot 118, and is composed of two L-shaped plates 105 welded to the body 114 of the column section 102. The two L-shaped plates 105 are spaced apart to form a longitudinally-extending slot 118 that opens into a longitudinally-extending cavity 116. Reinforcing plates 120 are welded between the body 114 and L-shaped plates 105 to reinforce the first interlocking element 104.

The second interlocking element 106 is a T-shaped or I-beam-shaped rail that is welded to the body 114. The base of the T-shaped rail is welded to the body 114, and the cross bar extends outwardly thereof. The rail extends longitudinally along the column section 102 on the side opposite the first interlocking element 104. When adjacent columns are coupled together, the T-shaped rail of the second interlocking element 106 passes through the slot 118 in the first interlocking element 104 and into the cavity 116. The cross bar of the T-shaped rail prevents the two interlocking elements from separating laterally.

As shown in FIG. 13, adjacent columns 112 are slidably coupled to each other along the first and second interlocking elements 104, 106. The first and second interlocking elements 104, 106 permit relative sliding motion between a column 112 being driven into the subsurface and the adjacent, previously driven column 112. The first and second interlocking elements 104, 106 maintain the spaced relationship between adjacent columns 112 and also help prevent the columns 112 from becoming skewed relative to one another when being driven into the subsurface. The first and second interlocking elements 104, 106 are shown 180 degrees from one another around the circumference of the column section 102, which permits the columns 112 to form a straight barrier wall. The interlocking elements, however, can be positioned at other angles, so that the barrier wall can be formed into a variety of shapes.

Figure 12:
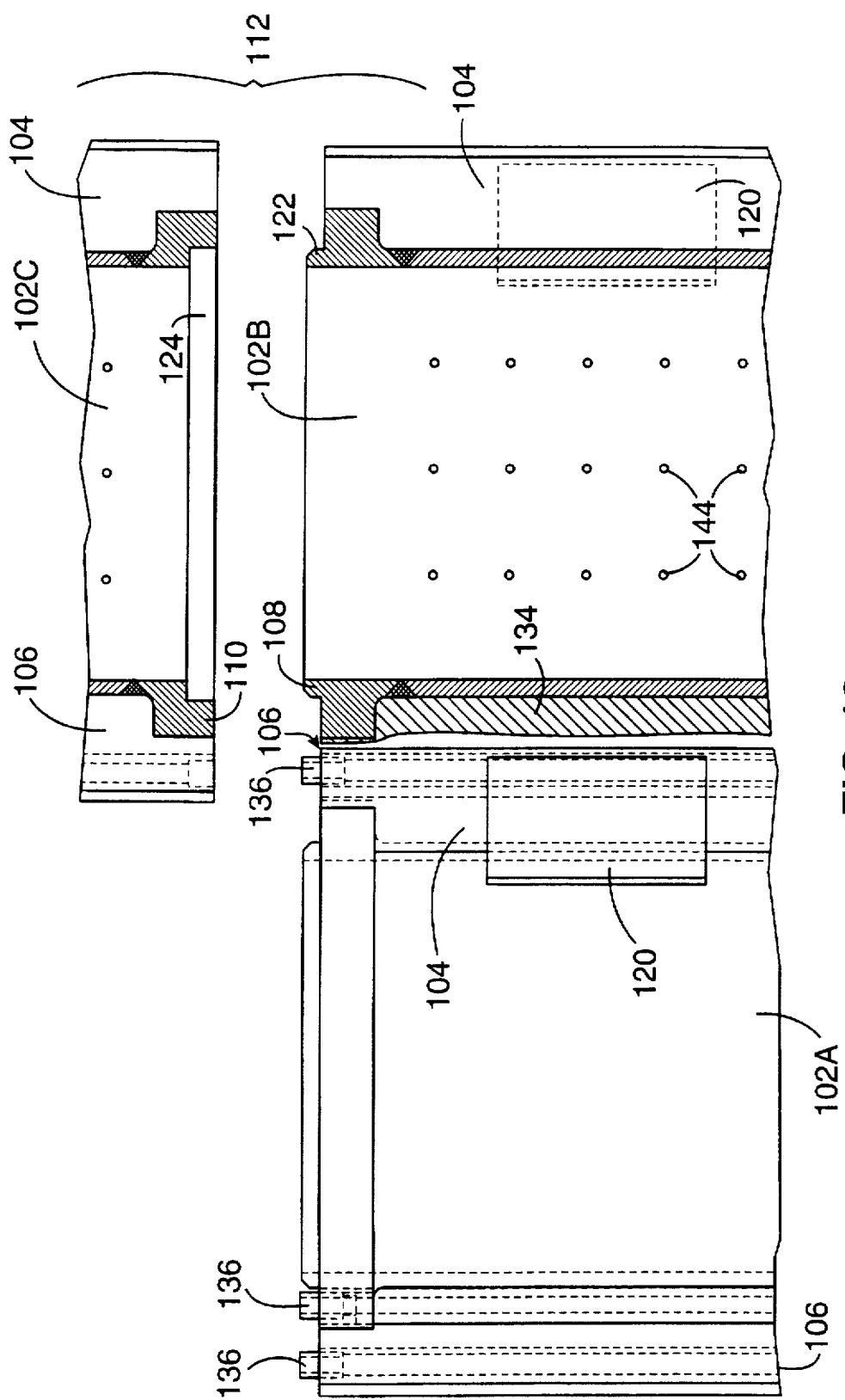
FIG. 12 is a partial cross-sectional view of two interlocked columns and two column sections forming a column.

Referring to FIG. 12, two column sections 102A, 102B are shown coupled together with by the first and second interlocking elements 104, 106, and a third column section 102C is shown separated from the other two column sections 102A, 102B. As the column 112 is driven into the subsurface, column section 102C is attached to column section 102A by bolting the lower flange 110 of the column section 102C to the upper flange 108 of column section 102B. A column 112 of any desired depth may be formed with an appropriate number of column sections 102 bolted together at their flanges. A barrier wall of any desired size, depth or shape may be formed by driving an appropriate number of interlocking columns 112.

Figure 16:
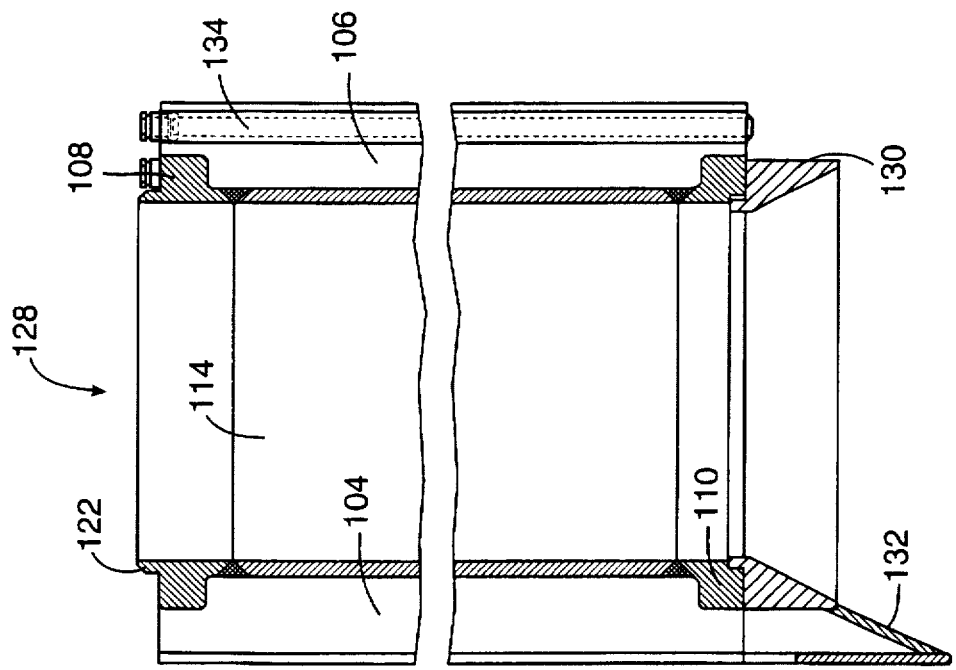
FIG. 16 is a cross-sectional view of the bottom section.
Figure 15:
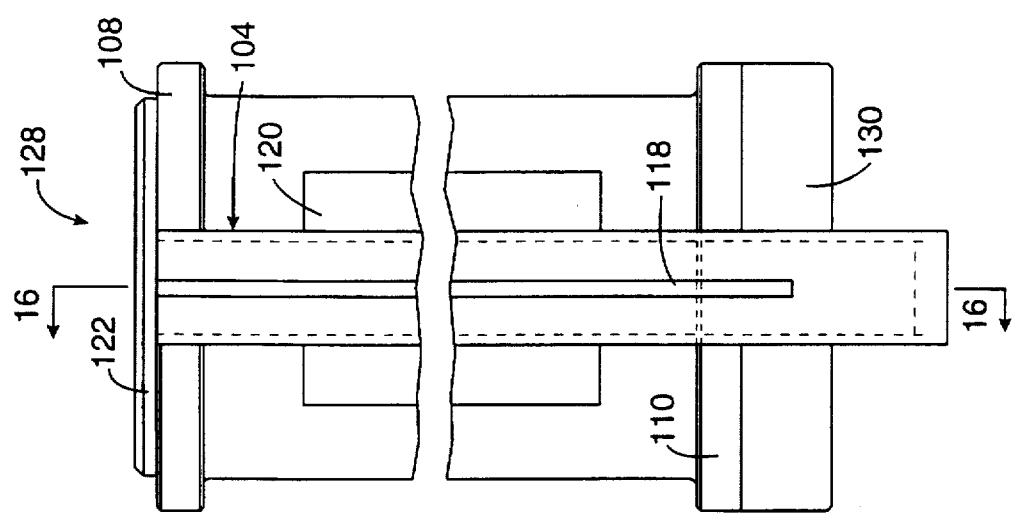
FIG. 15 is a side view of a bottom column section having a drive shoe to facilitate driving the column into the subsurface.

Referring to FIGS. 15 and 16, side and cross-sectional views of a bottom column section 128 are shown. The bottom section 128 is the lowermost section of each column 112 and has a bevelled drive element 130 welded to the lower flange 110 to facilitate driving the column 112 into the subsurface. The drive element may be open or it may be closed to prohibit formation material from entering the hollow interior of the column. An extension 132 is a plate welded to the body 114 and first interlocking element 104 to seal the space between the first interlocking element 104 and body 114 to prevent subsurface material from entering the cavity 116. The second interlocking element 106 may also include a spiked lower end for driving the second interlocking element 106 into the subsurface, however, this is unnecessary so long as the second interlocking element 106 passes through the cavity 116 of the previously driven column.

Referring again to FIG. 13, in order to provide a substantially fluid impermeable seal between adjacent columns 112, the space between the first and second interlocking elements 104, 106 must be sealed. To seal the space between the first and second interlocking elements 104, 106, a sealant is injected into the space through pipes 134 that extend longitudinally between the columns 112. The pipes 134 have outlets 133 directed toward the slot 118. The sealant is preferably grout, however, any other sealant may be used such as cement or wax. Injecting a sealant through the pipes 134 is a preferred method of sealing the interlocking connection, however, any other method may be used including an elastomeric seal between the first and second interlocking elements 104, 106, freezing a liquid in the space, or filling the hollow interior of the cavity 116 with a sealant material such as wax, grout, polymer, or other viscous sealer prior to installation of column 112.

Two sets of pipes extend longitudinally along the T-shaped rail of the second interlocking element 106. Preferably two pipes are used, although fewer or more than two pipes could be used. One of the pipes 134 passes through cut-outs 135 in the upper and lower flanges 108, 110 and is welded to the body 114. The other pipe 134 is welded to the second interlocking element 106. Although it is preferred to weld or otherwise attach the pipes 134 to the columns 112, the pipes 134 may be lowered between the columns 112 after the columns 112 have been driven into the subsurface. Furthermore, although it is preferred to use rigid pipes 134, a flexible pipe or hose may also be used. Pipes 134 may be perforated anywhere along their length or left solid.

Figure 14:
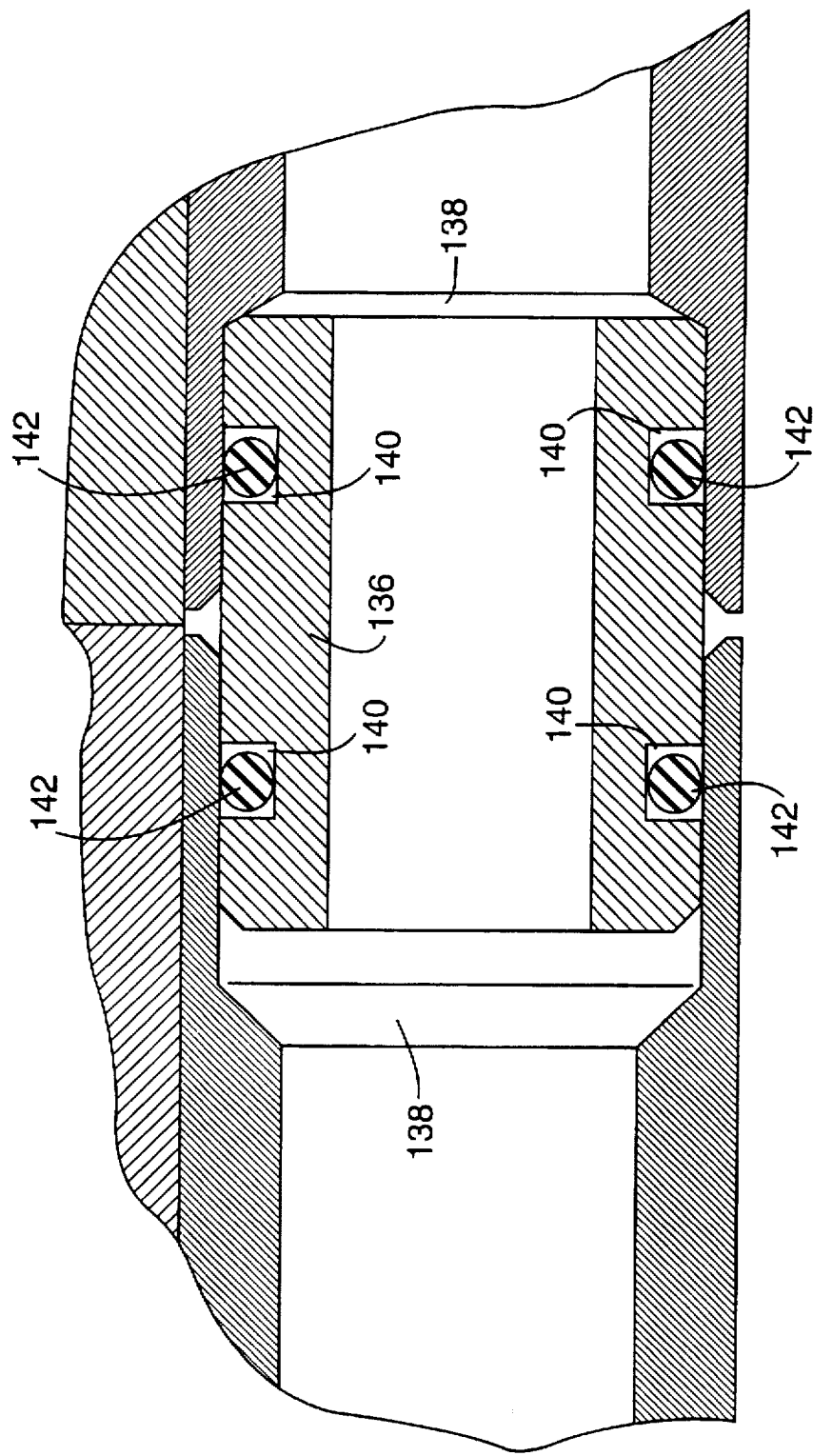
FIG. 14 is a cross-sectional view of a ferrule for a pipe used to seal the interlocking connections.

The pipes 134 of two stacked column sections 102 are coupled together by ferrules 136. Referring to FIG. 14, the ferrules 136 are positioned in recesses 138 at the ends of the pipes 134. The ferrule 136 has grooves 140 which receive O-rings 142. The ferrules 136 are added as each new column section 102 is bolted to the column 112. An advantage of the ferrules 136 is that no welding is required to seal the pipes 134.

Referring again to FIG. 12, the barrier wall may include openings 144 through the pipe 114 so that fluid or soil gas can enter the interior space of the columns 112. In a preferred method of using the barrier wall, a remediation material is introduced into the columns 112 to treat fluid entering the column 112. An advantage of the barrier wall of the present invention is that a different remediation process may be undertaken in each of the columns 112. The results of each remediation process can then be reviewed and the optimum process selected. The openings 144 may be also be provided on both sides of the barrier wall if the remediation process taking place in the hollow interior cleans the groundwater to a sufficient degree that it can simply flow through the column 112. When undertaking such a remediation plan it may be advantageous to use a substantially square or rectangular column 112 so that the minimum travel distance through the column 112 is the same across the width of the column 112.

The method of installing a barrier wall according to the present invention is now described. The following description uses the structure described above as an example of a barrier wall which may be constructed using the method of the present invention, however, other structures may be used to carry out the method. As discussed above, the barrier wall make take different sizes or shapes for accomplishing a number of different tasks.

One of the bottom sections 128 (FIGS. 15 and 16) is driven into the subsurface with a percussive drive hammer such as the drive hammer shown in FIGS. 8 and 9. A column section 102 (FIG. 10 and 11) is then added by attaching the lower flange 110 of the new column section 102 to the upper flange 108 of the previously driven column section 102. Additional column sections are added as the column 112 is driven farther into the subsurface. This procedure is continued until the column 112 is driven into the subsurface to the desired depth, preferably to a fluid impermeable layer.

As the column is driven into the subsurface, the interior of the column 112 is preferably cleaned out with another drilling tool such as the sonic drill head 8 and sonic drill string 16 described in connection with FIGS. 1 and 2. Although it is preferred to clean out the interior of the column 112 with the sonic drill head 8, other drilling tools may be used, including percussive hammer, air rotary, mud rotary or the cable tool assembly 12. Furthermore, the casing may be advanced with a closed drive element that displaces all material out into the formation as driving progresses. The drilling tool is preferably driven ahead of the bottom section 128 in the manner shown in FIG. 4, however, the column 112 may also be driven simultaneously in the manner shown in FIGS. 3 or may even be driven after the bottom section 128. The complete disclosure of the drilling methods and devices of FIGS. 1-9 is incorporated here with the column 112 being a substitute for the casing 18.

Preferably, the column 112 is driven into the subsurface after the drill string 16 has been removed. After removing the drill string 16, only an annular shoulder remains in the borehole which is easily broken by the column 112. By removing the drill string 16 and the subsurface material before driving the column 112, the resistance to driving the column 112 is reduced thereby minimizing the likelihood that the column 112 being driven becomes skewed with respect to the adjacent column 112. Furthermore, when using the sonic tool, the columns 112 may be driven through relatively hard formations with the sonic drilling tool substantially cleaning out the interior of the column 112 ahead of the column 112. The other advantages of the sonic drilling method described above are equally advantageous here. The spoils removing step, which is illustrated at time T4 in FIG. 4, may be performed either before or after driving the column 112.

The columns 112 are added, one next to the other with the first and second interlocking connections 104, 106 being coupled together, until the desired barrier wall is formed. The interconnections between the columns 112 are sealed by injecting sealant through the pipes 134, or by another method discussed above. The barrier wall may form an enclosed structure, or it may be a flat wall that intercepts the subsurface flow. The barrier wall may have a gate, such as the gate described in U.S. Pat. No. 5,487,622, a remediation chamber, or an extraction well for treating or otherwise removing the contaminated fluid. Alternatively, the hollow interior of the columns 112 themselves may be used as remediation chambers. The barrier wall may include the openings 144 on one side of the barrier wall or may include openings 144 on both sides of the wall so that each column 112 operates in a manner similar to the gate of U.S. Pat. No. 5,487,622.

Any remediation process may be carried out in the columns 112. For example, an absorbent, bioreactive, or chemically reactive material may be introduced into the columns 112. The material may be lowered in a perforated basket for easy replacement. Another use for the barrier wall is to simply seal a contaminated area. The interior of the columns 112 can be sealed by lowering a plasma torch, a concentric carbon graphite arc melter, or any other appropriate heating element, into the hollow interior to pyrolize the contents and form a permanent wall. Another method of sealing the wall is to circulate a cold brine solution through the hollow interior to freeze the subsurface surrounding the column 112. The freezing medium can be circulated directly in the column 112 or may be circulated in a tube lowered into the column 112 to freeze the annular area between the tube and the column. This in turn would freeze the area surrounding the tube and create an impermeable barrier to the movement of fluids in the subsurface. Furthermore, the space between the columns 112 may also be sealed by circulating a freezing medium in the columns 112 so that fluid between adjacent columns 112 is frozen which avoids the necessity of using the pipes 134.

From the above description, it will be apparent that the invention disclosed herein provides a novel and advantageous apparatus and related method for constructing a subsurface barrier wall. The foregoing discussion discloses and describes merely exemplary methods and embodiments of the present invention. As will be understood by those familiar with the art, the invention may be embodied in other specific forms without departing from the spirit or essential characteristics thereof. Although the barrier wall method and structure have been described in connection with the subsurface control of contaminant migration, the methods described herein may be used to provide a substantially fluid impermeable barrier wall for any other use such as a construction element or a fluid diverting wall to simply prevent saturation of an area. Accordingly, the disclosure of the present invention is intended to be illustrative, but not limiting, of the scope of the invention, which is set forth in the following claims.

What is claimed is:

1. A method of forming a barrier wall in a subsurface, comprising the steps of:

driving a first column into a subsurface, the first column having a first interlocking connection extending longitudinally along the first column, and further having a hollow interior;

driving a second column into the subsurface adjacent to and interlocking with the first column, the second column having a second interlocking connection extending longitudinally along the second column, wherein the second column is driven into the subsurface so that the first interlocking connection interlocks with the second interlocking connection, wherein the second column has a hollow interior that is independent from the hollow interior of the first column;

forming a substantially fluid impermeable seal in the interlocking connections between the first and second columns; and before each driving step, removing a portion of the substrate by advancing a barrel through the hollow interiors of each column and into the subsurface and then removing the barrel from the subsurface.

2. The method of claim 1, wherein the barrel advancing step is carried out by advancing the barrel into the subsurface with a sonic driver.

3. The method of claim 1, wherein the barrel advancing step is carried out before the column driving step.

4. The method of claim 1, further comprising the steps of introducing a remediation material into the hollow interior of a column, and providing openings through the lateral sides of the column to permit liquid in the subsurface to enter the hollow interior to come into contact with the remediation material.

5. The method of claim 1, further comprising providing openings on one side of a column, wherein liquid in the subsurface enters the hollow interior from one side of the column and is prevented from exiting the hollow interior from the other side of the column.

6. The method of claim 1, wherein the step of forming a substantially fluid impermeable seal includes the steps of:

providing a pipe having openings, wherein the pipe is positioned adjacent the interlocking connections of the first and second columns; and injecting a sealing material through the pipe and out the openings to seal between the first and second columns.

7. The method of claim 1 wherein the column driving steps include the steps of:

driving a first column section into a subsurface;

joining a second column section onto the top of the first column section; and driving the joined first and second column sections into the subsurface.

8. A method of forming a subsurface barrier wall, comprising the steps of:

removing subsurface to form a first hole in the subsurface;

driving a first column into the first hole in the subsurface, the first column having a first sidewall surrounding an interior;

removing subsurface to form a second hole in the subsurface adjacent to the first hole;

driving a second column into the second hole in the subsurface adjacent the first column, the second column having a second sidewall surrounding an interior; and sealing a space between the first and second sidewalls so that a substantially fluid impermeable seal is formed between the first and second columns;

wherein the subsurface removal steps include removing a portion of the substrate by advancing a barrel into the subsurface with a sonic driver and then removing the barrel from the subsurface.

9. The method of claim 8 wherein the column driving steps are carried out with a percussive drive hammer.

10. An underground barrier wall, comprising:

a first column having first and second interlocking elements extending longitudinally along opposite sides of the first column, and further having a hollow interior, the first column comprising at least two column sections stacked together and having connectors disposed therebetween, the connectors defining cut-outs;

a second column having first and second interlocking elements extending longitudinally along opposite sides of the second column, the second column being linearly slidable relative to the first column, wherein the first interlocking element of the first column is coupled to the second interlocking element of the second column, the second column comprising at least two column sections stacked together and having connectors disposed therebetween, the connectors defining cut-outs; and a pipe extending adjacent to an interlocking element and having openings directed toward the interlocking element, wherein the pipe extends through one or more of the cut-outs in the connectors.

11. The barrier wall of claim 10, wherein the first interlocking element includes a T-shaped rail and the second interlocking element includes a channel with an open slot that receives the T-shaped rail.

12. The barrier wall of claim 10, further comprising a pipe extending longitudinally adjacent to an interlocking element and having openings directed toward a space between the first and second interlocking elements.

13. The barrier wall of claim 10, wherein the hollow interiors of the first and second columns have circular cross-sectional shapes.

14. The barrier wall of claim 10, wherein the first interlocking element has a T-shaped cross-section.

15. The barrier wall of claim 10, wherein the second interlocking element has a slot which receives a portion of the first interlocking element.

16. The barrier wall of claim 10, wherein the hollow interiors of the first and second columns have circular cross-sectional shapes.

17. The barrier wall of claim 10, wherein the first/and second columns each include a drive element disposed at a lower end thereof to displace the subsurface as the columns are driven into the subsurface.

18. The barrier wall of claim 17, wherein the drive tip has a beveled edge.

19. A method of forming a barrier wall in a subsurface, comprising the steps of:

driving a first column into a subsurface, the first column having a first interlocking connection extending longitudinally along the first column, and further having a hollow interior;

driving a second column into the subsurface adjacent to and interlocking with the first column, the second column having a second interlocking connection extending longitudinally along the second column, wherein the second column is driven into the subsurface so that the first interlocking connection interlocks with the second interlocking connection, wherein the second column has a hollow interior that is independent from the hollow interior of the first column;

forming a substantially fluid impermeable seal in the interlocking connections between the first and second columns sealing the interiors of the columns; and fluidly sealing the hollow interiors of the first and second columns.

20. The method of claim 19 where the sealing step comprises lowering a heating element into the hollow interior to pyrolyze the contents and form a permanent wall.

21. The method of claim 19 wherein the sealing step comprises introducing a liquid into the hollow interior of a column, and freezing the liquid in the hollow interior.

* * * * *